US008644228B2

(12) United States Patent
Kim et al.

(10) Patent No.: US 8,644,228 B2
(45) Date of Patent: Feb. 4, 2014

(54) METHOD AND APPARATUS OF ALLOCATING RESOURCES IN WIRELESS COMMUNICATION SYSTEM

(75) Inventors: Kang-Hee Kim, Busan (KR); Byung-Han Ryu, Daejeon (KR)

(73) Assignees: Electronics and Telecommunications Research Institute, Daejeon (KR); Samsung Electronics Co., Ltd., Suwon-Si (KR)

( * ) Notice: Subject to any disclaimer, the term of this patent is extended or adjusted under 35 U.S.C. 154(b) by 469 days.

(21) Appl. No.: 12/522,813

(22) PCT Filed: Dec. 11, 2007

(86) PCT No.: PCT/KR2007/006447
§ 371 (c)(1),
(2), (4) Date: Jul. 10, 2009

(87) PCT Pub. No.: WO2008/084922
PCT Pub. Date: Jul. 17, 2008

(65) Prior Publication Data
US 2010/0098007 A1 Apr. 22, 2010

(30) Foreign Application Priority Data

Jan. 12, 2007 (KR) .................. 10-2007-0003992
May 16, 2007 (KR) .................. 10-2007-0047413

(51) Int. Cl.
*H04W 4/00* (2009.01)
(52) U.S. Cl.
USPC .......................................... 370/329; 379/341

(58) Field of Classification Search
USPC ................................................. 370/329, 341
See application file for complete search history.

(56) References Cited

U.S. PATENT DOCUMENTS

| 2002/0126675 | A1 | 9/2002 | Yoshimura et al. |
| 2004/0203658 | A1 | 10/2004 | Narayanan |
| 2005/0047335 | A1 * | 3/2005 | Cheng et al. .................. 370/229 |
| 2005/0204054 | A1 | 9/2005 | Wang et al. |
| 2006/0176839 | A1 | 8/2006 | Frazer et al. |
| 2007/0184842 | A1 * | 8/2007 | Pedersen et al. ............... 455/450 |
| 2009/0022098 | A1 * | 1/2009 | Novak et al. .................. 370/329 |
| 2009/0274107 | A1 * | 11/2009 | Park et al. ..................... 370/329 |

OTHER PUBLICATIONS

International Search Report for PCT/KR2007/006447, mailed Mar. 10, 2008.

* cited by examiner

*Primary Examiner* — Noel Beharry
*Assistant Examiner* — Kodzovi Acolatse
(74) *Attorney, Agent, or Firm* — Staas & Halsey LLP

(57) ABSTRACT

The present invention relates to a resource allocation device for efficiently using resources by persistently allocating the resources in a wireless communication system, and a method thereof. In the method, a quality of service (QoS) configuration is received according to a predetermined service, persistent resource allocation is performed according to a resource allocation request corresponding to the QoS configuration, various retransmission methods are determined when performing the persistent resource allocation, transmission data are established according to the determined retransmission method, and the transmission data are transmitted.

14 Claims, 3 Drawing Sheets

METHOD AND APPARATUS OF ALLOCATING RESOURCES IN WIRELESS COMMUNICATION SYSTEM

CROSS REFERENCE TO RELATED APPLICATIONS

This application claims the benefit under 35 U.S.C. Section 371, of PCT International Application Number PCT/KR2007/006447, filed Dec. 11, 2007 and Korean Application Nos. 10-2007-0003992 filed Jan. 12, 2007 and 10-2007-0047413 filed May 16, 2007, the contents of all of which are incorporated herein by reference.

TECHNICAL FIELD

The present invention relates to a resource allocation device of a wireless communication system, and a method thereof. More particularly, the present invention relates to a resource allocation device for efficiently using resources by performing persistent resource allocation in a wireless communication system, and a method thereof.

This work was supported by the IT R&D program of MIC/IITA [2005-S-404-12, Research & Development of Radio Transmission Technology for 3 G evolution].

BACKGROUND ART

Generally, in a wireless communication system, wireless terminals communicate with each other through a base station. In this case, a medium access control (MAC) method for shared radio resources and a radio resource allocation method are defined between the base station and the respective wireless terminals.

A conventional resource allocation method of a wireless communication system will now be described.

The respective wireless terminals request resources from the base station when the terminals have data to be transmitted to the base station. Then, the base station considers the resource allocation request of the wireless terminals and transmission data of the base station and allocates the resources to the wireless terminals.

The wireless terminals transmit the data to the base station after receiving the resources. In this case, the base station determines whether an error occurs in the transmission data, and when an error is determined to have occurred, the base station informs the wireless terminal of a hybrid automatic repeat request (HARQ) feedback channel or information on the error.

The wireless terminal receiving the HARQ feedback channel or information on the error requests the resources from the base station, and the base station allocates the resources requested by the wireless terminal. A control channel for resource allocation is used to transmit information on the resource allocation from the base station to the wireless terminal, and the control channel for the resource allocation is additionally used to allocate resources requested by the wireless terminal.

To prevent this resource waste, resources are persistently allocated when it is required to persistently transmit/receive data, and resources allocated at predetermined times are used without additional resource allocation or a resource request control channel after resource allocation information is transmitted through a resource allocation control channel once or a minimum number of times.

A persistent resource allocation process will now be described with reference to FIG. 1. FIG. 1 is a diagram of a conventional resource allocation process and a feedback channel of a wireless communication system.

As shown in FIG. 1, when the wireless terminal receives a feedback of HARQ NACK N from the base station after transmitting first data D1, the wireless terminal uses previously received resources to transmit second data D2 having the same information as the first data D1.

In addition, when receiving the feedback of HARQ NACK N from the base station again, the wireless terminal uses persistently allocated resources to transmit third data D3 having the same information as the first data D1.

The above information disclosed in this Background section is only for enhancement of understanding of the background of the invention and therefore it may contain information that does not form the prior art that is already known in this country to a person of ordinary skill in the art.

DISCLOSURE

Technical Problem

Thereby, the base station determines whether an error occurs in the third data D3, and transmits a feedback of HARQ ACK A to the wireless terminal.

However, as shown in FIG. 1, since three resources E that have been persistently allocated may not be immediately allocated even when receiving the feedback of the HARQ ACK after transmitting the third data D3, there is a problem in wasting the resources E. In addition, since the HARQ feedback channel is used, there is a problem in using the additional control channel.

Technical Solution

The present invention has been made in an effort to provide a resource allocation device for efficiently using resources by performing persistent resource allocation in a wireless communication system and a method thereof.

In addition, the present invention has been made in an effort to provide a method for efficiently performing resource allocation by using a system that is simplified by performing multiple transmissions through the persistent resource allocation without using a hybrid automatic repeat request (HARQ) feedback channel in a wireless interface of a very high-speed wireless communication system.

Therefore, it is an object of the present invention to support persistent resource allocation and multiple transmissions for the very high-speed wireless communication system.

According to an exemplary embodiment of the present invention, in a method for allocating resources in a wireless communication system, a quality of service (QoS) configuration is received according to a predetermined service, persistent resource allocation is performed according to a resource allocation request corresponding to the QoS configuration, various retransmission methods are determined when performing the persistent resource allocation, transmission data are established according to the determined retransmission method, and the transmission data are transmitted. Here, resources allocated by the persistent resource allocation are classified into temporary resources and persistent allocation resources based on persistence of the allocated resources. In addition, the persistent allocation resources include super-periods, and each super-period has micro-allocation.

Further, in the method, a QoS feedback path is maintained, a feedback of the QoS configuration is received, and the QoS configuration is updated. The persistent resource allocation is informed by using a time configuration in which the super-period is valid.

A resource allocation size to perform the persistent resource allocation, a modulation method, or a channel-coding method is determined, and the transmission data are established according to the determined resource allocation size, modulation method, or channel coding method, and the transmission data are then transmitted. A retransmission method and a number of retransmissions are previously established with respect to an established success rate of the transmission data, and the multiple transmissions are performed the number of times established when performing the transmission data or the number of times corresponding to resources established when performing the transmission data.

When the persistent resource allocation is performed, entire period resource allocation is performed by using the super-period and the micro-allocation. In addition, when the persistent resource allocation is performed, the persistent resource allocation is performed to each user of service when the entire period resource allocation is performed to multiple users or services. Further, when the persistent resource allocation is performed, unallocated resources are persistently or temporarily allocated to another service when the entire period resource allocation is not performed.

According to another exemplary embodiment of the present invention, a device for allocating resources in a wireless communication system includes a controller, a resource allocation unit, a transmission block configuration subsystem, and a transmission unit for transmitting the transmission data determined by the transmission block configuration subsystem. The controller receives a QoS configuration according to a predetermined service and requests resource allocation corresponding to the QoS configuration. The resource allocation unit performs persistent resource allocation according to the resource allocation requested by the controller, and determines retransmission methods. The transmission block configuration subsystem determines transmission data according to the retransmission method determined by the resource allocation unit, and the transmission unit transmits the transmission data determined by the transmission block configuration subsystem.

Here, the controller maintains an additional QoS feedback path, receives a feedback of the QoS configuration through the QoS feedback path, and updates the QoS configuration.

Advantageous Effects

As described, according to the exemplary embodiment of the present invention, since the multiple transmissions are performed by the persistent resource allocation without using the feedback channel of the wireless communication system, resources may be efficiently allocated by using a simplified system.

MODE FOR INVENTION

Figure 1:
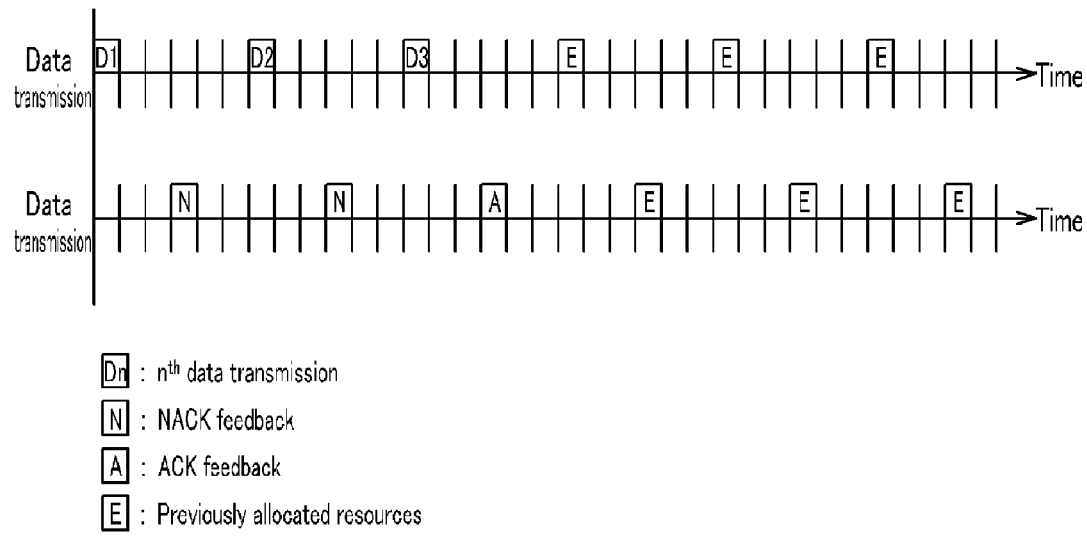
FIG. 1 is a diagram of a resource allocation process and feedback channel of a conventional wireless communication system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise", and variations such as "comprises" and "comprising", will be understood to imply the inclusion of stated elements but not the exclusion of any other elements. The term "unit" used herein means one unit that processes a specific function or operation, and may be implemented by hardware, software, or a combination thereof.

A resource allocation method of a wireless communication system according to an exemplary embodiment of the present invention and a device thereof will now be described.

Figure 2:
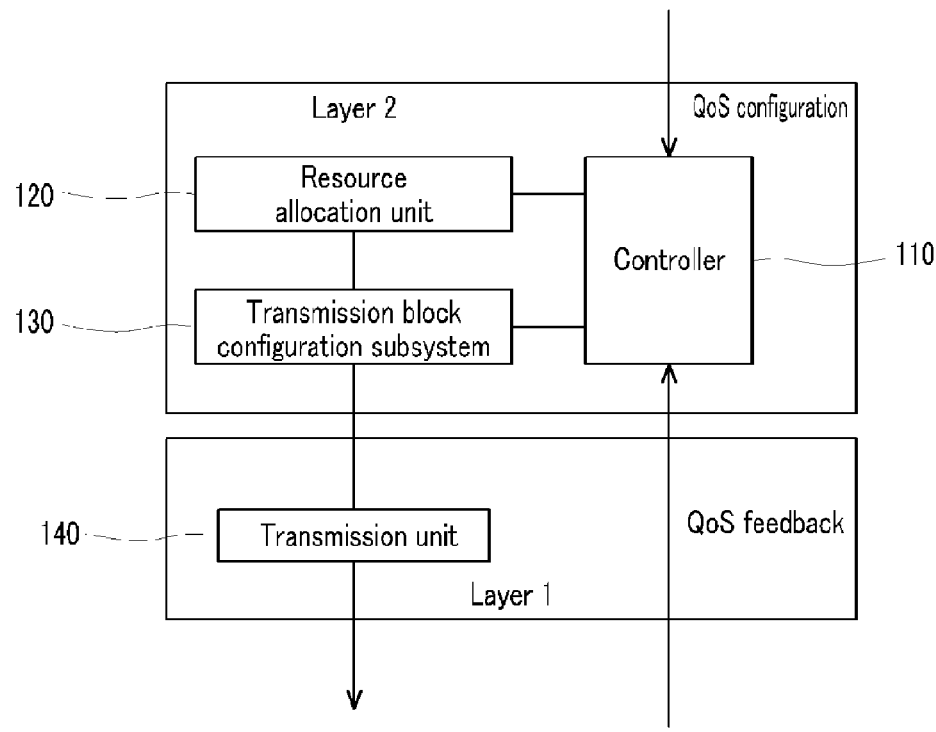
FIG. 2 is a schematic view representing layers 1 and 2 of a wireless communication system according to an exemplary embodiment of the present invention.
Figure 3:
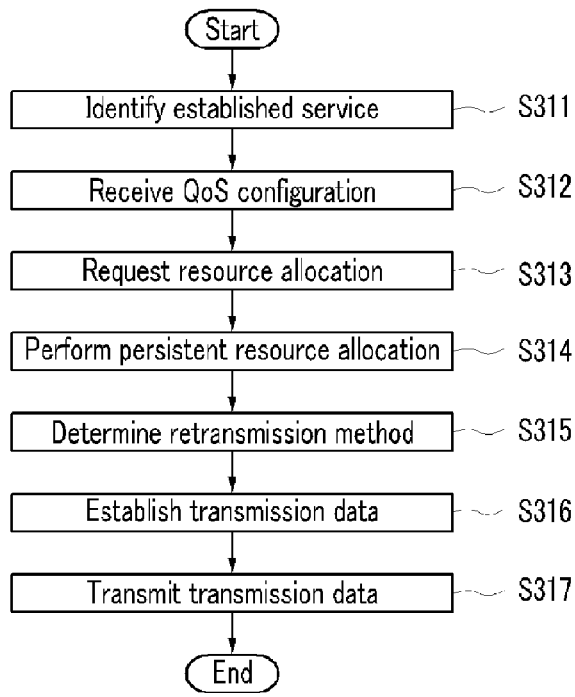
FIG. 3 is a flowchart representing a resource allocation method of the wireless communication system according to the exemplary embodiment of the present invention.

FIG. 2 is a schematic view representing layers 1 and 2 of the wireless communication system according to the exemplary embodiment of the present invention.

As shown in FIG. 2, a resource allocation device of the wireless communication system according to the exemplary embodiment of the present invention includes a controller 110, a resource allocation unit 120, a transmission block configuration subsystem 130, and a transmission unit 140.

The controller 110 that is a persistent service quality of service (QoS) control subsystem receives QoS configuration according to a previously established service (e.g., a HARQ operation mode of the wireless terminal), and requests the resource allocation unit 120 to allocate resources corresponding to the QoS configuration. In addition, the controller 110 maintains an additional QoS feedback path to maintain QoS quality, and receives the QoS configuration as a feedback through the QoS feedback path to update the QoS configuration.

The resource allocation unit 120 that is a persistent resource allocation subsystem performs persistent resource allocation according to a resource allocation request requested by the controller 110. The resource allocation unit 120 determines retransmission methods (e.g., a systematic code, and a coding rate), resource allocation sizes, modulation methods, and channel coding methods to perform the persistent resource allocation, and applies a corresponding determined pattern to the transmission block configuration subsystem 130.

The transmission block configuration subsystem 130 establishes transmission data (i.e., information relating to the pattern determined by the resource allocation unit 120) according to the pattern determined by the resource allocation unit 120, and applies the established data to the transmission unit 140.

The transmission unit 140, which is a layer 1 coding chain, transmits the transmission data applied from the transmission block configuration subsystem 130 to a wireless channel.

The resource allocation method of the wireless communication system according to the exemplary embodiment of the present invention will now be described with reference to FIG. 3 to FIG. 6.

Firstly, the controller 110 identifies a current established service (e.g., a HARQ operation mode of the wireless terminal) in step S311, receives a QoS configuration according to the identified service in step S312, and requests the resource allocation unit 120 to allocate resources for the received QoS configuration in step S313. Here, information on the QoS configuration may be stored in a database according to previously established services.

In this case, to maintain QoS quality, the controller 110 may update the QoS configuration after receiving the QoS configuration through a corresponding QoS feedback path while maintaining an additional QoS feedback path.

Accordingly, the resource allocation unit 120 receives a resource allocation request from the controller 110 and performs persistent resource allocation in step S314. Here, resources allocated by the persistent resource allocation may be classified into temporary resources and persistent allocation resources based on persistence of the allocated resources.

Figure 4:
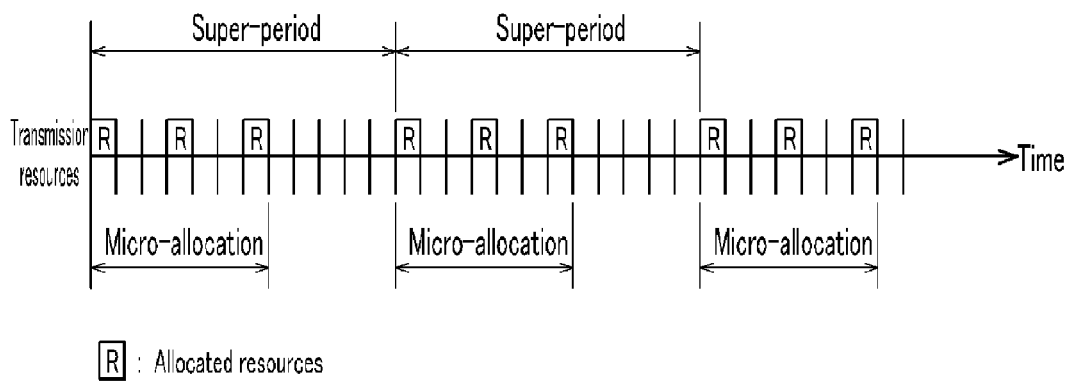
FIG. 4 is a timing diagram representing persistent resource allocation of the wireless communication system according to the exemplary embodiment of the present invention.

As shown in FIG. 4, the persistent allocation resources R include super-periods and each super-period includes microallocation. In addition, the persistent resource allocation may be informed by using a time configuration in which the superperiod is valid. FIG. 4 is a timing diagram representing the persistent resource allocation of the wireless communication system according to the exemplary embodiment of the present invention.

Figure 5:
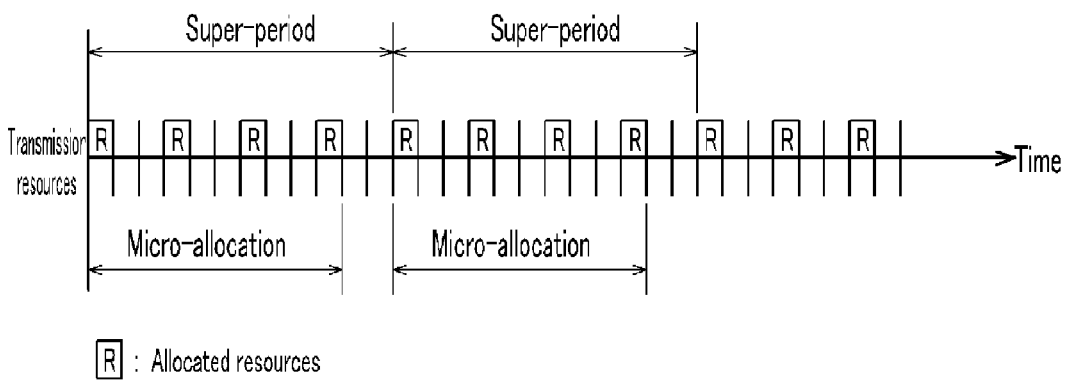
FIG. 5 is a timing diagram representing the persistent resource allocation of the wireless communication system according to the exemplary embodiment of the present invention.

When the super-period and the micro-allocation are used, as shown in FIG. 5, entire period resource allocation may be performed. FIG. 5 is a timing diagram representing the persistent resource allocation of the wireless communication system according to the exemplary embodiment of the present invention.

Figure 6:
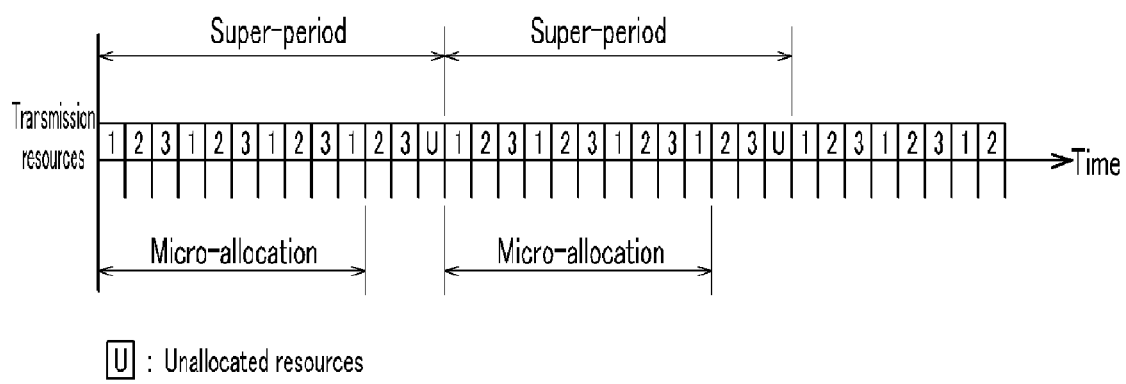
FIG. 6 is a timing diagram representing multiple persistent resource allocation and un-allocated resources in the wireless communication system according to the exemplary embodiment of the present invention.

When the entire period resource allocation as shown in FIG. 5 is performed for multiple users or services, the persistent resource allocation may be performed to a first service 1 (or a first user), and it may be performed to second and third services 2 and 3 (or second and third users) as shown in FIG. 6. FIG. 6 is a timing diagram representing multiple persistent resource allocation and un-allocated resources in the wireless communication system according to the exemplary embodiment of the present invention.

Since periods of a service and a system may not always correspond to each other, when the system has a configuration that is not the entire period, resources, such as unallocated resources U, shown in FIG. 6 that are not appropriately allocated may be persistently or temporarily allocated to another service. Therefore, the resource allocation shown in FIGS. 4 and 6 is better than the entire period resource allocation shown in FIG. 5.

In addition, the resource allocation unit 120 determines the retransmission method (e.g., the systematic code and the coding rate) in step S315 to perform the persistent resource allocation, and applies a corresponding determined pattern to the transmission block configuration subsystem 130. The resource allocation unit 120 may further determine the resource allocation size, the modulation method, and the channel coding method in addition to the retransmission method when the persistent resource allocation is performed.

The transmission block configuration subsystem 130 configures data transmitted according to the pattern determined by the resource allocation unit 120 (i.e., information relating to the pattern determined by the resource allocation unit 120 in step S316), and applies the configured transmission data to the transmission unit 140. The transmission unit 140 transmits the transmission data applied from the transmission block configuration subsystem 130 to a radio channel in step S317.

In a single frequency network using one frequency though the entire network, transmission power from a cell edge may affect capacity of neighboring cells. Accordingly, high transmission power from the cell edge may problematically affect the cell capacity, which is not limited to the SFN.

Accordingly, since initial transmission power is reduced by using a retransmission algorithm, such as the HARQ, in step S317 to successfully transmit data after performing multiple transmission operations, the cell capacity may be increased in addition to performing quick retransmission that is a basic purpose of the HARQ.

The number of retransmissions in which the data transmission satisfies a predetermined success rate may be sufficiently determined according to the resource allocation size, the modulation method, the retransmission method (e.g., the systematic-code, and the encoding rate), and the channel coding method, and so the number of resource allocations that exceeds a predetermined number is unnecessary. Accordingly, in the exemplary embodiment of the present invention, the retransmission method and the number of retransmissions with respect to the predetermined success rate of the data transmission are previously established.

Subsequently, the retransmission method and the number of retransmission determined in step S317 with respect to the success rate of the data transmission is determined, and as shown in FIG. 6, multiple transmissions corresponding to the allocated number of times and resources are performed regardless of the feedback through the HARQ feedback channel.

In this case, when N persistent resources are allocated by the micro-allocation, N transmissions may be failed regardless of the feedback channel. Accordingly, since the multiple transmissions are performed according to the exemplary embodiment of the present invention and the transmission power is not considerably affected in the base station, the resource allocation method according to the exemplary embodiment of the present invention is particularly applicable for downlink transmission, but can be also applied for uplink transmission. In addition, since the wireless terminal does not use the uplink feedback channel, the control channels are reduced, and complexity may be reduced. Further, it is not required to consider the resources for the feedback for the persistent allocation.

To maintain the quality of the system, the controller 110 may establish the QoS feedback process. The QoS feedback process may be established through a physical channel, and it may be formed as an upper message type or a similar upper information type. In addition, uplink transmission and downlink transmission may be used in the same configuration, the uplink transmission may have the HARQ feedback channel while the downlink transmission does not have HARQ feedback channel, or an opposite configuration thereof may be established.

As described, according to the exemplary embodiment of the present invention, the multiple transmissions are performed without using the feedback channel of the wireless communication system having the high data rate, the cell capacity is increased by the multiple transmissions, and the complexity may be reduced while the cell capacity is maintained. In addition, the resource allocation device of the wireless communication system according to the exemplary embodiment of the present invention may be applied to another type of system (e.g., a cellular system).

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for allocating resources in a wireless communication system, the method comprising:
    receiving a quality of service (QoS) configuration according to a predetermined service;
    performing persistent resource allocation according to a resource allocation request corresponding to the QoS configuration;
    determining a retransmission method from among various retransmission methods while performing the persistent resource allocation, the determining being prior to receipt of an acknowledgement for the resource allocation request; and
    transmitting data according to the retransmission method determined based on validity of a timing of the persistent resource allocation indicated during the determining, and
    wherein an entire period of the persistent resource allocation includes super-periods, and each super-period contains a micro-allocation in which a plurality of persistent resources for a same user are periodically allocated within a corresponding super-period, and
    wherein the timing is adjusted such that an interval between adjacent two of the plurality of persistent resources for the same user is a constant, and is different from an interval between a last persistent resource for the same user of the super-period and an end of the super-period.

2. The method of claim 1, further comprising maintaining a QoS feedback path, receiving a feedback of the QoS configuration, and updating the QoS configuration.

3. The method of claim 1, wherein resources allocated by the persistent resource allocation are classified into temporary resources and persistent allocation resources based on persistence of the allocated resources.

4. The method of claim 1, further comprising informing the persistent resource allocation by using a time configuration in which the super-period is valid.

5. The method of claim 1, wherein, in the performing of the persistent resource allocation, unallocated resources are persistently or temporarily allocated to another service when the entire period resource allocation is not performed.

6. The method of claim 1, wherein the retransmission methods include a systematic code and a coding rate.

7. The method of claim 1, further comprising:
    determining a resource allocation size to perform the persistent resource allocation, a modulation method, or a channel-coding method; and
    establishing the transmission data according to the determined resource allocation size, modulation method, or channel coding method, and transmitting the transmission data.

8. The method of claim 1, wherein, in the transmitting of the transmission data, a hybrid automatic repeat request (HARQ) is used and initial transmission power is reduced to perform multiple transmissions.

9. The method of claim 1, further comprising:
    previously establishing a retransmission method and a number of retransmissions with respect to an established success rate of the transmission data; and
    performing the multiple transmissions the number of times established when performing the transmission data or the number of times corresponding to resources established when performing the transmission data.

10. The method of claim 1, wherein transmissions of the resources corresponding to an allocated number of times are performed regardless of receipt of a feedback.

11. The method of claim 1, wherein the interval between adjacent two of the plurality of persistent resources for the same user is shorter than the interval between the last persistent resource for the same user of the super-period and the end of the super-period.

12. A device for allocating resources in a wireless communication system, the device comprising:
    a base station executing an operation including:
        receiving a quality of service (QoS) configuration according to a predetermined service and requesting resource allocation corresponding to the QoS configuration;
        performing persistent resource allocation according to the resource allocation requested by the controller, and determining a retransmission method from among retransmission methods, the determining being prior to receipt of an acknowledgement for the resource allocation request; and
        transmitting data according to the retransmission method determined based on validity of a timing of the persistent resource allocation indicated during the determining;
    and
    wherein an entire period of the persistent resource allocation includes super-periods, and each super-period contains a micro-allocation in which a plurality of persistent resources for a same user are periodically allocated within a corresponding super-period, and
    wherein the timing is adjusted such that an interval between adjacent two of the plurality of persistent resources for the same user is a constant, and is different from an interval between a last persistent resource for the same user of the super-period and an end of the super-period.

13. The device of claim 12, wherein an additional QoS feedback path is maintained, a feedback of the QoS configuration through the QoS feedback path is received, and the QoS configuration is updated.

14. The device of claim 12, wherein the interval between adjacent two of the plurality of persistent resources for the same user is shorter than the interval between the last persistent resource for the same user of the super-period and the end of the super-period.

* * * * *